United States Patent Office 3,352,850
Patented Nov. 14, 1967

3,352,850
SYNTHETIC PENICILLINS
Frank Peter Doyle, Betchworth, and John Herbert Charles Nayler, Dorking, England, assignors to Beecham Group Limited, Brentford, England, a British company
No Drawing. Filed Mar. 26, 1963, Ser. No. 267,911
Claims priority, application Great Britain, Feb. 16, 1960, 5,519/60
13 Claims. (Cl. 260—239.1)

This invention relates to new synthetic compounds of value as antibacterial agents, as nutritional supplements in animal feeds, as agents for the treatment of mastitis in cattle and as therapeutic agents in poultry and animals, including man, in the treatment especially of infectious diseases caused by Gram-positive bacteria and, more particularly, relates to novel penicillins and nontoxic salts thereof.

This application is as to each of the following individual applications a continuation-in-part: application Ser. No. 88,652, filed Feb. 13, 1961, Ser. Nos. 97,155 and 97,158, filed Mar. 21, 1961, and Ser. No. 98,339, filed Mar. 27, 1961, all now abandoned.

Antibacterial agents such as benzylpenicillin have proven highly effective in the past in the therapy of infections due to Gram-positive bacteria but such agents suffer from the serious drawbacks of being unstable in aqueous acid, e.g., upon oral administration, and of being ineffective against numerous so-called resistant strains of bacteria, e.g., penicillin-resistant strains of *Staphylococcus aureus* (*Micrococcus pyogenes* var. *aureus*). In addition, benzylpenicillin is not an effective agent against many bacteria which produce penicillinase. Many of the compounds of the present invention, in addition to their potent antibacterial activity, exhibit resistance to destruction by acid or by penicillinase or are effective against benzylpenicillin-resistant strains of bacteria or inhibit benzylpenicillinase and thus potentiate the action of benzylpenicillin when admixed therewith or are safe for use in patients who cannot be given benzylpenicillin because they exhibit allergic reactions thereto.

There is provided, according to the present invention, a member selected from the group consisting of an acid having the formula

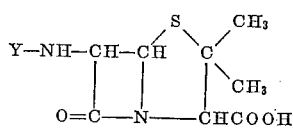

wherein Y represents a member selected from the group consisting of radicals having the formulae

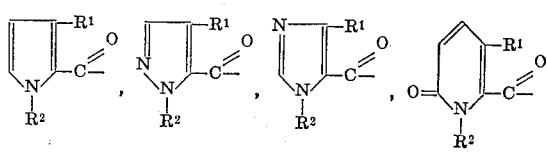

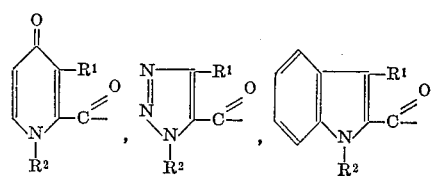

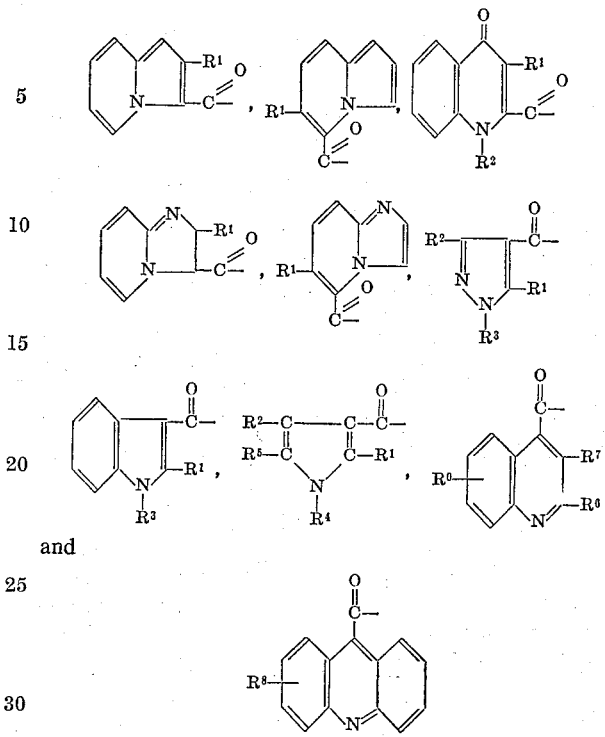

wherein $R^1$ and $R^2$ each represent a member selected from the group consisting of nitro, (lower)alkyl, (lower)alkoxy, (lower)alkanoylamino, chloro, bromo, iodo, fluoro, hydroxy, (lower)alkylthio, cyclohexyl, cyclopentyl, cycloheptyl, (lower)alkoxycarbonyl, mercapto, (lower)alkylsulfonyl, (lower)alkanoyl, (lower)alkanoyloxy and the three radicals having the formulae and wherein $n$ is an integer from zero to three inclusive and $R^9$, $R^{10}$ and $R^{11}$ each represent a member selected from the group consisting of hydrogen, fluoro, bromo, chloro, iodo, trifluoromethyl, (lower)alkyl, (lower)alkoxy, hydroxy, nitro and amino;

$R^3$ represents a member selected from the group consisting of hydrogen, (lower)alkyl and the radical having the formula wherein $R^9$, $R^{10}$ and $R^{11}$ have the meaning defined above;
$R^4$ represents a member selected from the group consisting of hydrogen and (lower)alkyl;
$R^5$ represents a member selected from the group consisting of hydrogen and $R^1$ as defined above;
$R^6$ and $R^7$ each represent a member selected from the group consisting of (lower)alkyl, (lower)alkoxy, chloro, bromo, iodo, fluoro, cyclohexyl, cyclopentyl, cycloheptyl and the two radicals having the formulae $$\underset{R^{10}}{\underset{R^{11}}{\bigvee}}\overset{R^9}{-}(CH_2)_n- \quad \text{and} \quad \underset{R^{10}}{\underset{R^{11}}{\bigvee}}\overset{R^9}{-}O-$$

wherein $n$ is an integer from zero to three inclusive and $R^9$, $R^{10}$ and $R^{11}$ have the meaning defined above; and $R^8$ represents a member selected from the group consisting of hydrogen and $R^6$ as defined above; and nontoxic pharmaceutically acceptable salts thereof.

Thus to the extent indicated above $R^1$, $R^2$, $R^3$, $R^5$, $R^6$, $R^7$ and $R^8$ may be nitro, (lower)alkyl, (lower)alkoxy, acylamino [where the acylating agent is an aliphatic carboxylic acid containing from one to ten carbon atoms inclusive and thus may also be named (lower)alkanoylamino], chloro, bromo, iodo, fluoro, hydroxy, (lower)alkylthio, cyclohexyl, cyclopentyl, cycloheptyl, aryloxy [including phenoxy, chlorophenoxy, bromophenoxy, (lower)alkylphenoxy, e.g. tolyloxy and (lower)alkoxyphenoxy, e.g. methoxyphenoxy, etc.], aralkyl (including benzyl, α- and β-phenethyl and α- and β- and γ-phenylpropyl, etc.), arylthio [including phenylthio, chlorophenylthio, (lower)alkylphenylthio, (lower)alkoxyphenylthio, etc.] and aryl [including phenyl, nitrophenyl, chlorophenyl, bromophenyl, (lower)alkylphenyl, (lower)alkoxyphenyl, etc.], aralkyloxy, aralkylthio, acyl, acyloxy, alkoxycarbonyl, mercapto or alkylsulfonyl and $R^3$, $R^5$ and $R^8$ may also be hydrogen.

The nontoxic, pharmaceutically acceptable salts include metallic salts such as sodium, potassium, calcium and aluminum, the ammonium salt and substituted ammonium salts, e.g., salts of such nontoxic amines as trialkylamines, including triethylamine, procaine, dibenzylamine, N-benzyl - beta - phenethylamine, 1 - ephenamine, N,N'-dibenzylethylenediamine, dehydroabietylamine, N,N'-bis-dehydroabietylethylenediamine, N - (lower)alkylpiperidines, e.g. N-ethylpiperidine, and other amines which have been used to form salts with benzylpenicillin. The term "(lower)alkyl" as used herein means both straight and branched chain aliphatic hydrocarbon radicals having from one to ten carbon atoms such as methyl, ethyl, propyl, isopropyl, butyl, isobutyl, t-butyl, amyl, hexyl, 2-ethylhexyl, heptyl, decyl, etc. Similarly, where the term "(lower)" is used as part of the description of another group, e.g. "(lower)alkoxy" it refers to the alkyl portion of such group which is therefore as described above in connection with "(lower)alkyl." The term "aryl" as used herein (in the terms "aryl," "arylthio" and "aryloxy") refers to the phenyl radical per se and to substituted phenyl radicals of the formula $$\underset{R^{10}}{\underset{R^{11}}{\bigvee}}\overset{R^9}{-}$$

wherein $R^9$, $R^{10}$ and $R^{11}$ each represent a member selected from the group consisting of hydrogen, fluoro, chloro, bromo, iodo, trifluoromethyl, (lower)alkyl, (lower)alkoxy, hydroxy, nitro and amino. Also included within the scope of the present invention are easily hydrolyzed esters which are converted to the free acid form by chemical or enzymatic hydrolysis.

A preferred embodiment of the present invention comprises the penicillins having the formula $$\underset{R^2}{\underset{N}{\bigvee}}\overset{R^1}{-}\overset{O}{\underset{\|}{C}}-NH-CH-\underset{\underset{CO-N}{|}}{CH}\overset{S}{\underset{}{\diagdown}}\underset{CHCOOH}{\overset{CH_3}{\diagup}}C-CH_3$$

and nontoxic salts thereof, wherein $R^1$ and $R^2$ have the meaning set forth above.

Seven other preferred embodiments of the present invention are the following:

(a) A member selected from the group consisting of an acid having the formula $$\underset{\underset{H}{N}}{\underset{N}{\bigvee}}\overset{R^1}{-}\overset{O}{\underset{\|}{C}}-NH-CH-\underset{\underset{O=C-N}{|}}{CH}\overset{S}{\underset{}{\diagdown}}\underset{CHCOOH}{\overset{CH_3}{\diagup}}C-CH_3$$

wherein $R^1$ and $R^2$ each represent (lower)alkyl.

(b) A member selected from the group consisting of an acid having the formula $$\underset{\underset{C_6H_5}{N}}{\underset{N}{\bigvee}}\overset{R^1}{-}\overset{O}{\underset{\|}{C}}-NH-CH-\underset{\underset{O=C-N}{|}}{CH}\overset{S}{\underset{}{\diagdown}}\underset{CHCOOH}{\overset{CH_3}{\diagup}}C-CH_3$$

wherein $R^1$ and $R^2$ each represent (lower)alkyl.

(c) A member selected fom the group consisting of an acid having the formula $$\underset{\underset{R^3}{N}}{\underset{N}{\bigvee}}\overset{R^1}{-}\overset{O}{\underset{\|}{C}}-NH-CH-\underset{\underset{O=C-N}{|}}{CH}\overset{S}{\underset{}{\diagdown}}\underset{CHCOOH}{\overset{CH_3}{\diagup}}C-CH_3$$

wherein $R^1$, $R^2$ and $R^3$ each represent (lower)alkyl.

(d) A member selected from the group consisting of an acid having the formula $$\underset{\underset{H}{N}}{\underset{N}{\bigvee}}\overset{R^1}{-}\overset{O}{\underset{\|}{C}}-NH-CH-\underset{\underset{O=C-N}{|}}{CH}\overset{S}{\underset{}{\diagdown}}\underset{CHCOOH}{\overset{CH_3}{\diagup}}C-CH_3$$

wherein $R^1$ and $R^2$ each represent (lower)alkyl.

(e) A member selected from the group consisting of an acid having the formula $$\underset{\underset{R^3}{N}}{\underset{N}{\bigvee}}\overset{R^1}{-}\overset{O}{\underset{\|}{C}}-NH-CH-\underset{\underset{O=C-N}{|}}{CH}\overset{S}{\underset{}{\diagdown}}\underset{CHCOOH}{\overset{CH_3}{\diagup}}C-CH_3$$

wherein $R^1$, $R^2$ and $R^3$ each represent (lower)alkyl.

(f) A member selected from the group consisting of an acid having the formula $$\underset{\underset{R^3}{N}}{\underset{N}{\bigvee}}\overset{R^1}{-}\overset{O}{\underset{\|}{C}}-NH-CH-\underset{\underset{O=C-N}{|}}{CH}\overset{S}{\underset{}{\diagdown}}\underset{CHCOOH}{\overset{CH_3}{\diagup}}C-CH_3$$

wherein $R^1$ and $R^3$ represent (lower)alkyl.

(g) A member selected from the group consisting of an acid having the formula $$\underset{\underset{R^2}{N}}{\underset{}{\bigvee}}\overset{}{-}\overset{O}{\underset{\|}{C}}-NH-CH-\underset{\underset{N}{|}}{CH}\overset{S}{\underset{}{\diagdown}}\underset{CHCOOH}{\overset{CH_3}{\diagup}}C-CH$$

wherein $R^1$ and $R^2$ each represent (lower)alkyl.

The products of the present invention are prepared by reaction of 6-aminopenicillanic acid, preferably in the form of a neutral salt such as the sodium salt or the triethylamine salt, with an acid chloride having the formula Y—Cl wherein Y has the meaning set forth above, or its functional equivalent as an acylating agent for a primary amino group. Such equivalents include the corresponding carboxylic acid bromides, acid anhydrides and mixed anhydrides with other carboxylic acids, including monoesters, and particularly lower aliphatic esters, of carbonic acid.

Thus, an elegant procedure for preparing a compound of the present invention by way of a mixed anhydride with ethoxy- or isobutyloxy-carbonic acid comprises mixing 0.01 mole of an acid (whose acid chloride is set forth above), 0.01 mole isobutyl chloroformate and 0.011 mole tertiary hydrocarbonyl or aliphatic amine such as triethylamine in an anhydrous, inert and preferably water-miscible solvent such as p-dioxane (e.g. 20 ml.) and if desired, 2 ml. pure, dry acetone for about thirty minutes in the cold, e.g. at about 4° C. To this solution of the mixed anhydride there is then added a chilled solution of 0.01 mole 6-aminopenicillanic acid and 0.01 mole tertiary hydrocarbonyl amine, e.g. triethylamine, in, for example 20 ml. of a solvent such as water. The reaction mixture is stirred for a period of an hour or so to form the substituted ammonium salt of the desired product. The mixture may then, if desired, be extracted at alkaline pH (such as pH 8; aqueous sodium bicarbonate may be used, for example, if necessary to adjust the pH) with a water-immiscible solvent such as ether to remove unreacted starting materials. The product in the aqueous phase is then converted to the free acid, preferably in the cold, under a layer of ether by the addition of dilute mineral acid, e.g. 5 N $H_2SO_4$ to pH 2. The free acid is then extracted into a water-immiscible, neutral organic solvent such as ether and the extract is washed with water quickly in the cold, if desired, and dried, as with anhydrous $Na_2SO_4$. The product in the ethereal extract in its free acid form is then converted to any desired metal or amine salt by treatment wtih the appropriate base, e.g. a free amine such as procaine base or a solution of potassium 2-ethylhexanoate in dry n-butanol. These salts are usually insoluble in solvents such as ether and can be recovered in pure form by simple filtration.

Another method of preparing an ethereal solution of the acid form of a compound of the present invention comprises preparing a solution in 20 ml. water of 0.00463 mole 6-aminopenicillanic acid and 1.56 gm. sodium bicarbonate, adding 0.00476 mole of an acid chloride whose formula is set forth above and shaking vigorously at room temperature, e.g. for twenty to sixty minutes. The mixture is then extracted with ether to remove unreacted or hydrolyzed starting materials. The solution is then acidified (preferably in the cold) to pH 2, as with dilute sulfuric acid, and the free acid form of the product is extracted into ether (e.g. two portions of 25 ml.). This ethereal extract is dried, as with anhydrous sodium sulfate, and the drying agent is removed to leave a dry ethereal solution from which the product is easily isolated, preferably in the form of an ether-insoluble salt such as the potassium salt. This procedure is used when the acid chloride reacts with a primary amine more rapidly than it does with water, as determined by simple test. In this procedure the acid chloride may be replaced by an equimolar amount of the corresponding acid bromide or acid anhydride.

Since some of the antibiotic substances obtained by the process of this invention are relatively unstable compounds which readily undergo chemical changes resulting in the loss of an antibiotic activity, it is desirable to choose reaction conditions which are sufficiently moderate to avoid their decomposition. The reaction conditions chosen will, of course, depend largely upon the reactivity of the chemical reagent being used. In most instances, a compromise has to be made between the use of very mild conditions for a lengthy period and the use of more vigorous conditions for a shorter time with the possibility of decomposing some of the antibiotic substance.

The temperature chosen for the process of preparation of the derivatives of penicillanic acid should in general not exceed 30° C. and in many cases a suitable temperature is ambient temperature. Since the use of strongly acid or alkaline conditions in the process of this invention should be avoided, it has been found preferable to perform the process at a pH of from 6 to 9, and this can conveniently be achieved by using a buffer, for example, a solution of sodium bicarbonate, or a sodium phosphate buffer. In addition to the use of aqueous media for the reaction, including filtered fermentation broths or aqueous solutions of crude 6-aminopenicillanic acid, use can be made of organic solvents which do not contain reactive hydrogen atoms. Examples of such inert solvents are dimethylformamide, dimethylacetamide, chloroform, acetone, methyl isobutyl ketone and dioxane. Frequently, it is highly satisfactory to add an aqueous solution of a salt of 6-aminopenicillanic acid to a solution of the acylating agent in an inert solvent and preferably in an inert solvent which is miscible with water, such as acetone or dimethylformamide. Vigorous stirring is, of course, advisable when more than one phase is present, e.g. solid and liquid or two liquid phases.

At the conclusion of the reaction, the products are isolated, if desired, by the techniques used with benzylpenicillin and phenoxymethylpenicillin. Thus, the product can be extracted into diethyl ether or n-butanol at acid pH and then recovered by lyophilization or by conversion to a solvent-insoluble salt, as by neutralization with an n-butanol solution of potassium 2-ethylhexanoate, or the product can be precipitated from aqueous solution as a water-insoluble salt of an amine or recovered directly by lyophilization, preferably in the form of a sodium or potassium salt. When formed as the triethylamine salt, the product is converted to the free acid form and thence to other salts in the manner used with benzylpenicillin and other penicillins. Thus, treatment of such a triethylamine compound in water with sodium hydroxide converts it to the sodium salt and the triethylamine may be removed by extraction, as with toluene. Treatment of the sodium salt with strong aqueous acid converts the compound to the acid form, which can be converted to other amine salts, e.g. procaine, by reaction with the amine base. Salts so formed are isolated by lyophilization or, if the product is insoluble, by filtration. A particularly elegant method of isolating the product as a crystalline potassium salt comprises extracting the product from an acidic, aqueous solution (e.g., pH 2) into diethyl ether, drying the ether and adding at least one equivalent of a solution of potassium 2-ethylhexanoate (e.g. 0.373 gm./ml.) in dry n-butanol. The potassium salt forms, precipitates, usually in crystalline form, and is collected by filtration or decantation.

6-aminopenicillanic acid is prepared according to Batchelor et al. (Nature 183, 257–258, Jan. 24, 1959), or Belgian Patent 569,728.

Aqueous acetone is often a convenient solvent for the reaction, but anhydrous organic solvents together with an organic base may also be employed. Both solvent and base should be chosen so as not, themselves, to react preferentially with the reagent being employed. Acetone and triethylamine or chloroform and triethylamine have been found to be particularly useful.

It is sometimes preferred to prepare the new penicillins from a fermentation liquor containing 6-aminopenicillanic acid or one of its intermediate concentrates.

The following general formulae illustrate types of carboxylic acids which may be used in the present invention:

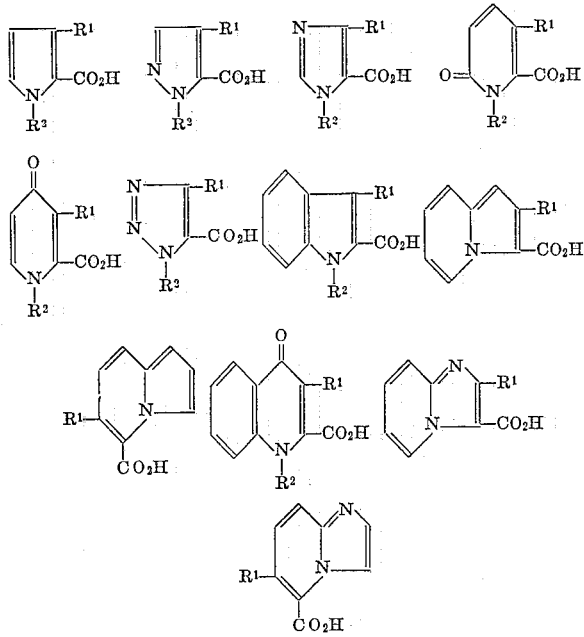

wherein $R^1$ and $R^2$ are as defined above.

2,4-dimethylpyrrole-3-carboxylic acid, and
2-methylindole-3-carboxylic acid.

Preferred embodiments of the present invention are the penicillins prepared from pyrrole-2-carboxylic acids substituted according to the general formula given above. By way of illustration, the following are the structures of some of these acids, together with a reference to literature giving a method for their preparation:

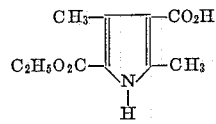

Treibs et al., Chem. Ber., 90, 79 (1957); McDonald, J. Chem. Soc. 4176 (1952); Org. Synth., coll. vol. II, p. 202.

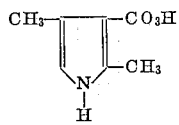

Knorr and Lange, Ber., 35, 3007 (1902),

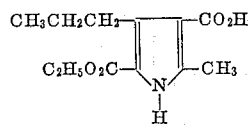

Fischer, Goldschmidt and Nussler, Ann., 486, 33 (1931),

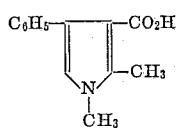

Almstron, Ann. 411, 367 (1916),

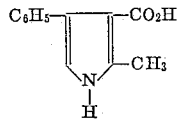

Knorr, Ber., 35, 3002 (1902),

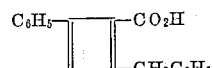

Sonn and Litten, Ber., 66, 1519 (1933),

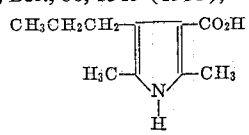

Knorr and Hess, Ber., 44, 2762 (1911).

Others of the starting acids are prepared according to the following reaction scheme:

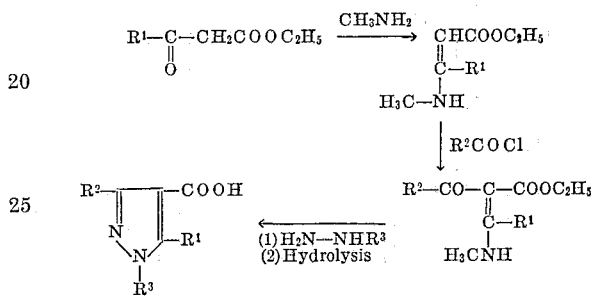

The following examples will serve to illustrate the invention but are not to be construed to limit it.

EXAMPLE 1

A solution of 1-methyl-3-phenylindole-2-carbonyl chloride (5.73 g., prepared as described by Borsche and Klein, Annalen, 1941, 548, 64) in dry acetone (40 ml.) was added during 15 mins. to a stirred solution of 6-aminopenicillanic acid (4.33 g.) and sodium bicarbonate (5 g.) in water (90 ml.) and acetone (50 ml.). The mixture was stirred for 4 hours but some solid remained undissolved. It was then extracted with ether (2× 100 ml.), only the aqueous phase being retained. The latter was covered with ether (50 ml.) and adjusted to pH 2 by adding N hydrochloric acid. The layers were separated and the aqueous phase was extracted with two further 25 ml. portions of ether. The combined ether extracts (which at this stage contained the free penicillin acid) were washed with water, and then shaken with sufficient 8% aqueous sodium bicarbonate solution to give a neutral aqueous phase (pH 7). The aqueous layer was separated, washed with ether, and evaporated at low temperature and pressure. The residue was finally dried in a vacuum desiccator to leave the crude sodium salt of 1-methyl-3-phenyl-2-indolyl-penicillin as a white powder (7.2 g.). Colorimetric assay with hydroxylamine against a benzylpenicillin standard indicated it to be about 57% pure.

The product inhibited Staph. Oxford at a concentration of 1.5 mcg./ml., the benzylpenicillin-resistant Staph. 1 at 5.0 mcg./ml., and the benzylpenicillin-resistant Staph. 2 at 5.0 mcg./ml.

Staph. 1 and Staph. 2 are typical benzylpenicillin-resistant strains of Staphylococcus which are inhibited by benzylpenicillin only at concentrations of at least 50 mcg./ml.

EXAMPLE 2

A solution of 1,3-diphenylindole-2-carbonyl chloride (3.67 g., crude product from treatment of the acid with thionyl chloride in benzene in the presence of pyridine) in dry acetone (66 ml.) was added during 10 mins. to a stirred solution of 6-aminopenicillanic acid (2.37 g.) in 3% aqueous sodium bicarbonate (93 ml.) and acetone (28 ml.). Some solid was precipitated from the yellow solution. The mixture was stirred for 4 hrs., but some solid remained undissolved. It was then extracted with ether (2× 120 ml.), only the aqueous phase being retained.

The latter was covered with ether (50 ml.) and adjusted to pH 2 by adding N hydrochloric acid. The layers were separated, and the aqueous phase was extracted with two further 50 ml. portions of ether.

The combined ether extracts, containing the free penicillin acid, were washed with water and then shaken with sufficient N aqueous sodium bicarbonate solution to give a neutral aqueous phase (pH 7). The aqueous layer was separated, washed with ether, and evaporated at low temperature and pressure to leave a residue of the crude sodium salt of 1,3-diphenyl-2-indolylpenicillin (2.4 g.).

Colorimetric assay with hydroxylamine against a benzylpenicillin standard indicated it to be about 53% pure.

The product inhibited Staph. Oxford at a concentration of 12.5 mcg./ml., the benzylpenicillin-resistant Staph. 1 at 125 mcg./ml., and the benzylpenicillin-resistant Staph. 2 at 125 mcg./ml.

EXAMPLE 3

A solution of 1,3-dimethylindole-2-carbonyl chloride (crude product from reacting 1,3-dimethylindole-2-carboxylic acid, 3.7 g., with thionyl chloride in benzene, containing a trace of pyridine) in dry chloroform (33 ml.) was added to a stirred suspension of 6-aminopenicillanic acid (4.33 g.) in dry chloroform (100 ml.), containing triethylamine (8.4 ml.). The mixture was stirred for 4 hrs. then filtered. The chloroform solution was shaken with N hydrochloric acid to give an aqueous phase of pH 2, only the chloroform phase being retained. The latter was washed with water (2× 50 ml.).

The chloroform solution was shaken with the theoretical amount of N aqueous sodium bicarbonate solution (20 ml.) to give a thick emulsion which was evaporated at low temperature and pressure to leave the crude sodium salt of 1,3-dimethyl-2-indolylpenicillin as a yellow-brown solid (7.6 g.).

Colorimetric assay with hydroxylamine against a benzylpenicillin standard indicated it to be about 51% pure.

The product inhibited Staph. Oxford at a concentration of 0.5 mcg./ml., the benzylpenicillin-resistant Staph. 1 at 25 mcg./ml., and the benzylpenicillin-resistant Staph. 2 at 12.5 mcg./ml.

EXAMPLE 4

Following the procedure of Example 1 the corresponding penicillins are produced from the following acid chlorides: 1-ethyl-3-phenylindole-2-carbonyl chloride, 1-n-butyl-3-phenylindole-2-carbonyl chloride, 1-benzyl-3-phenylindole-2-carbonyl chloride, 1-phenyl-3-methylindole-2-carbonyl chloride, 1-phenyl-3-ethylindole-2-carbonyl chloride, 1-phenyl-3-n-butylindole-2-carbonyl chloride, 1-phenyl-3-benzylindole-2-carbonyl chloride, 1,3-diethylindole-2-carbonyl chloride, 1,3-di-n-butylindole-2-carbonyl chloride, 1,3-dibenzylindole-2-carbonyl chloride.

EXAMPLE 5

*Preparation of 1,3,5-triphenyl-4-pyrazolylpenicillin*

A solution of 1,3,5-triphenylpyrazole-4-carbonyl chloride (4.75 g. of the crude product from the corresponding carboxylic acid and thionyl chloride) in dry chloroform (100 ml.) was added during 15 minutes to a stirred suspension of 6-aminopenicillanic acid (2.81 g.) in dry chloroform (65 ml.) containing triethylamine (5.5 ml.). The mixture was stirred for 3½ hours, then filtered. The chloroform solution was shaken with N hydrochloric acid to give an aqueous phase of pH 2, only the chloroform phase being retained. The latter was washed with water (2× 50 ml.).

The chloroform solution was shaken with the calculated amount of N aqueous sodium bicarbonate solution to give a thick emulsion which was evaporated at low temperature and pressure to leave a solid residue of the crude sodium salt of 1,3,5-triphenyl-4-pyrazolylpenicillin (7.75 g.).

Colorimetric assay with hydroxylamine against a benzylpenicillin standard indicated it to be about 42% pure.

It inhibited Staph. Oxford at a concentration of 12.5 mcg./ml., the benzylpenicillin-resistant Staph. 1 at 50 mcg./ml. and the benzylpenicillin-resistant Staph. 2 at 62.5 mcg./ml.

EXAMPLE 6

A solution of 3,5-dimethyl-1-phenylpyrazole-4-carbonyl chloride (4.69 g.) in dry acetone (120 ml.) was added during 10 minutes to a stirred solution of 6-aminopenicillanic acid (4.33 g.) in 3% aqueous sodium bicarbonate (168 ml.) and acetone (50 ml.). Some oil separated but this redissolved. The mixture was stirred for four hours. The solution was extracted with ether (2× 200 ml.), only the aqueous phase being retained. The latter was covered with ether (50 ml.) and adjusted to pH by adding N hydrochloric acid. The layers were separated, and the aqueous phase was extracted with two further 50 ml. portions of ether.

The combined ether extracts were washed with water and then shaken with sufficient N aqueous sodium bicarbonate solution to give a neutral aqueous phase (pH 7). The aqueous layer was separated, washed with ether, and evaporated at low temperature and pressure to leave a residue of the crude sodium salt of 3,5-dimethyl-1-phenyl-4-pyrazolylpenicillin (1.82 g.).

Colorimetric assay with hydroxylamine against a benzylpenicillin standard indicated it to be about 25% pure.

It inhibited Staph. Oxford at 0.5 mcg./ml.

EXAMPLE 7

*1,5-dimethyl-3-phenyl-4-pyrazolylpenicillin (sodium salt)*

A solution of 1,5-dimethyl-3-phenylpyrazole-4-carbonyl chloride (4.7 g.) in methylene chloride (30 ml.) was added dropwise to a stirred solution of 6-aminopenicillanic acid (4.3 g.) and triethylamine (8.3 g.) in methylene chloride (100 ml.) at 0° C., and was then allowed to stand overnight.

Normal hydrochloric acid was added with shaking until a pH of 2 was attained (35 ml.), and the methylene chloride layer was separated. This was shaken with sufficient 1 N sodium bicarbonate to bring the pH to 7 (15 ml.) and the aqueous extract was separated and evaporated to dryness at room temperature in vacuo. The penicillin sodium salt was obtained as a light brown solid (5.8 g., 65%). The purity by hydroxylamine assay was 66%.

The product inhibited Staph. Oxford at a concentration of 1.25 mcg./ml., Staph. 1 at 5 mcg./ml., and Staph. 2 at 5 mcg./ml.

The 1,5-dimethyl-3-phenylpyrazole-4-carbonyl chloride was prepared from the corresponding acid and thionyl chloride.

EXAMPLE 8

*1,2-dimethyl-3-indolylpenicillin*

A solution of 1,2-dimethylindole-3-carboxylic acid (3.78 g.) in dry benzene (50 ml.) was treated with thionyl chloride (3 ml.) and pyridine (3 drops), refluxed for 4 hours and evaporated under reduced pressure. The residual crude 1,2-dimethylindole-3-carbonyl chloride was dissolved in dry chloroform (33 ml.) and added during 10 minutes to a stirred suspension of 6-aminopenicillanic acid (4.33 g.) in dry chloroform (100 ml.) and triethylamine (8.4 ml.). The mixture was stirred at room temperature for 4 hours and then filtered. The orange-brown filtrate was shaken with sufficient N hydrochloric acid to give an aqueous phase of pH 2. The layers were separated and the chloroform solution was washed with water (2× 50 ml.) and then shaken with sufficient 8% aqueous sodium bicarbonate solution to give a neutral aqueous phase (pH 7). This final aqueous solution was separated and evaporated at low temperature and pressure to leave the crude sodium salt of 1,2-dimethyl-3-indolylpenicillin as a yellow-brown solid, which was finally dried over phosphorus pentoxide in vacuo. Yield 4.47 g. Colorimetric assay with hydroxylamine against a benzylpenicillin standard indicated to be about 70% pure.

EXAMPLE 9

*2-carbethoxy-3,5-dimethyl-4-pyrylpenicillin*

A suspension of 2-carbethoxy-3,5-dimethylpyrrole-4-carbonyl chloride (5.25 g., M.P. 202–204° C., prepared by heating 2-carbethoxy-3,5-dimethylpyrrole-4-carboxylic acid under reflux with an excess of acetyl chloride) in dry chloroform (100 ml.) was added duing 10 minutes to a stirred suspension of 6-aminopenicillanic acid (4.75 g.) in dry chloroform (150 ml.) containing triethylamine (9.3 ml.). The mixture was stirred for 4 hours, then filtered. The chloroform solution was shaken with N hydrochloric acid to give an aqueous phase of pH 2, only the chloroform phase being retained. The latter was washed with water (2× 50 ml.).

The chloroform solution was shaken with N aqueous sodium bicarbonate solution (19 ml.) to give a neutral aqueous phase (pH 7). An emulsion formed which did not separate readily and it was evaporated at low temperature and pressure to leave a light brown solid residue of the crude sodium salt of 2-carbethoxy-3,5-dimethyl-4-pyrylpenicillin (2.98 g.).

Colorimetric assay with hydroxylamine against a benzylpenicillin standard indicated it to be about 48% pure.

It inhibited Staph. Oxford at a concentration of 1.25 mcg./ml.

EXAMPLE 10

*3-ethoxy-2-methyl-4-quinolylpenicillin*

Thionyl chloride (0.95 ml.) was added slowly at room temperature to a solution of 3-ethoxy-2-methylquinoline-4-carboxylic acid (2.1 g.) in triethylamine (2.5 ml.) and methylene chloride (50 ml.). The mixture was stirred for 1 hour, then evaporated to dryness at room temperature under reduced pressure.

The pale colored residue was redissolved in methylene chloride (50 ml.) and added, with stirring, at room temperature to a solution of 6-aminopenicillanic acid (1.9 g.) in triethylamine (5.0 ml.) and methylene chloride (50 ml.). The mixture was allowed to stand overnight and was then filtered. The filtrate was washed with sufficient 1 N hydrochloric acid to produce a pH of about 2. The methylene chloride layer was then extracted with sufficient 1 N sodium bicarbonate to bring the pH to about 8 (8 ml.) and the aqueous extracts were then evaporated to dryness in vacuo at room temperature to give the penicillin as a pale solid, yield 2.2 g. (33%) estimated by the hydroxylamine procedure to be about 56% pure.

The product inhibited Staph. Oxford at 1.25 mcg./ml., Staph. 1 at 5 mcg./ml., and Staph. 2 at 5 mcg./ml.

EXAMPLE 11

*2-ethyl-3-methoxy-4-quinolylpenicillin*

Thionyl chloride (0.72 ml.) was added to a stirred solution of 2-ethyl-3-methoxyquinoline-4-carboxylic acid (2.3 g.) in chloroform (15 ml.) and triethylamine (2.8 ml.) at −20° C.

The reaction mixture was stirred at room temperature for 2 hours and was then filtered from some insoluble material. The filtrate was evaporated to dryness in vacuo and the residue was redissolved in ether. By treating the ethereal solution with 1 N hydrochloric acid followed by 1 N sodium bicarbonate solution as described under 3-ethoxy-2-methyl-4-quinolylpenicillin the desired 2-ethyl-3-methoxy-4-quinolylpenicillin was obtained as the sodium salt (2.4 g. 53%), estimated by the hydroxylamine procedure to be about 10% pure.

It inhibited Staph. Oxford at 2.5 mcg./ml., Staph. 1 at 25 mcg./ml., and Staph. 2 at 12.5 mcg./ml.

2-ethyl-3-methoxyquinoline-4 - carboxylic acid (M.P. 214° C., decomp.) was obtained from 2-ethyl-3-hydroxyquinoline-4-carboxylic acid by treatment with diazomethane in ether, followed by saponification of the resulting methyl ester with alcoholic potassium hydroxide.

EXAMPLE 12

The following quinolyl penicillins are prepared by reaction of the named acids with 6-aminopenicillanic acid by way of the acid chloride or other suitable intermediate in accordance with the procedure of the above examples.

| Acid | Penicillin |
| --- | --- |
| 3-methylquinoline-4-carboxylic acid. | 3-methyl-4-quinolyl penicillin. |
| 3-ethylquinoline-4-carboxylic acid. | 3-ethyl-4-quinolylpenicillin. |
| 3-n-propylquinoline-4-carboxylic acid. | 3-n-propyl-4-quinolylpenicillin. |
| 3-benzylquinoline-4-carboxylic acid. | 3-benzyl-4-quinolylpenicillin. |
| 3-phenylquinoline-4-carboxylic acid. | 3-phenyl-4-quinolylpenicillin. |
| 3-methoxyquinoline-4-carboxylic acid. | 3-methoxy-4-quinolylpenicillin. |
| 3-ethoxyquinoline-4-carboxylic acid. | 3-ethoxy-4-quinolylpenicillin. |
| 3-chloroquinoline-4-carboxylic acid. | 3-chloro-4-quinolylpenicillin. |
| 3-bromoquinoline-4-carboxylic acid. | 3-bromo-4-quinolylpenicillin. |
| 2-methyl-3-methoxyquinoline-4-carboxylic acid. | 2-methyl-3-methoxy-4-quinolylpenicillin. |
| 2-methyl-3-n-propoxyquinoline-4-carboxylic acid. | 2-methyl-3-n-propoxy-4-quinolylpenicillin. |
| 2-methyl-3-n-butoxyquinoline-4-carboxylic acid. | 2-methyl-3-n-butoxy-4-quinolylpenicillin. |
| 2-ethyl-3-ethoxyquinoline-4-carboxylic acid. | 2-ethyl-3-ethoxy-4-quinolylpenicillin. |
| 2-ethyl-3-n-propoxyquinoline-4-carboxylic acid. | 2-ethyl-3-n-propoxy-4-quinolylpenicillin. |
| 2-ethyl-3-n-butoxyquinoline-4-carboxylic acid. | 2-ethyl-3-n-butoxy-4-quinolylpenicillin. |
| 2-n-propyl-3-methoxyquinoline-4-carboxylic acid. | 2-n-propyl-3-methoxy-4-quinolylpenicillin. |
| 2-n-propyl-3-ethoxyquinoline-4-carboxylic acid. | 2-n-propyl-3-ethoxy-4-quinolylpenicillin. |
| 2-ethyl-3-methylquinoline-4-carboxylic acid. | 2-ethyl-3-methyl-4-quinolylpenicillin. |
| 2-n-propyl-3-ethylquinoline-4-carboxylic acid. | 2-n-propyl-3-ethyl-4-quinolylpenicillin. |
| 2-phenyl-3-methylquinoline-4-carboxylic acid. | 2-phenyl-3-methyl-4-quinolylpenicillin. |
| 2-phenyl-3-ethylquinoline-4-carboxylic acid. | 2-phenyl-3-ethyl-4-quinolylpenicillin. |

EXAMPLE 13

*9-acridylpenicillin*

Acridine 9-carboxylic acid (2.2 g.) was mixed with thionyl chloride (10 ml.) and refluxed for 2 hours. The solution was then evaporated at 80° under water vacuum and the residual solid filtered with the aid of anhydrous benzene and dissolved in dry alcohol-free chloroform (20 ml.). This solution was then added dropwise during 15 minutes to a stirred mixture of 6-aminopenicillanic acid (2.16 g.), dry alcohol-free chloroform (30 ml.) and triethylamine (2.8 ml.). After stirring for a further one hour, the solution was washed with water (10 ml.) plus enough 1 N hydrochloric acid (7.5 ml.) to give an aqueous phase of pH 2. The chloroform layer was then extracted with water (20 ml.) plus enough 3% aqueous sodium bicarbonate (20 ml.) to give an aqueous phase of pH 7. Ether (200 ml.) was used to clear an emulsion which formed at this stage. Evaporation of the bicarbonate phase at 30°/2 mm. left a residue which was dried over phosphorus pentoxide under vacuum to give the crude penicillin as a light green powder (0.8 g.): purity (by hydroxylamine assay), 36%.

The product inhibited Staph. Oxford at a concentration of 2.5 mcg./ml., Staph. 1 at 12.5 mcg./ml., and Staph. 2 at 12.5 mcg./ml.

Many of the new penicillins of the present invention possess the useful property of being relatively stable to acids, and thus are suitable for oral administration. As a measure of such stability, the "half-life" of 3-ethoxy-2-methyl- 4-quinolylpenicillin dissolved in 50% aqueous ethanol at pH 1.3 and 35° C. was found to be greater than ten hours as compared to 160 minutes for penicillin V and 3.5 minutes for penicillin G.

We claim:
1. An acid of the formula:

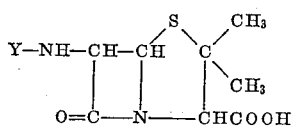

wherein Y is:

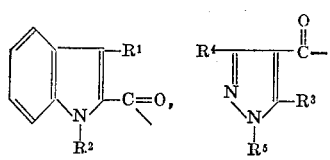

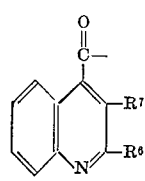

in which $R^1$ and $R^2$ are each (lower)alkyl, phenyl, chlorophenyl, dichlorophenyl or benzyl and at least one of $R^1$ and $R^2$ is (lower)alkyl; $R^3$ and $R^4$ are each (lower)alkyl, phenyl, chlorophenyl or dichlorophenyl and $R^5$ is hydrogen, (lower)alkyl, phenyl, chlorophenyl or dichlorophenyl but at least one of $R^3$, $R^4$ and $R^5$ is (lower)alkyl or hydrogen; $R^7$ is (lower)alkyl, (lower)alkoxy, chloro, bromo, phenyl or carbalkoxy and $R^6$ is hydrogen, (lower)alkyl or phenyl and no more than one of $R^6$ and $R^7$ is phenyl, or $R^6$ and $R^7$ taken together from benz or trimethylene; and non-toxic pharmaceutically acceptable salts thereof.

2. An acid of claim 1 having the formula:

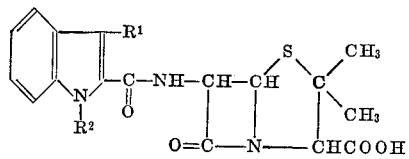

wherein $R^1$ and $R^2$ are each (lower)alkyl, phenyl, chlorophenyl, dichlorophenyl or benzyl and at least one of $R^1$ and $R^2$ is (lower)alkyl; and non-toxic, pharmaceutically acceptable salts thereof.

3. An acid of claim 1 having the formula:

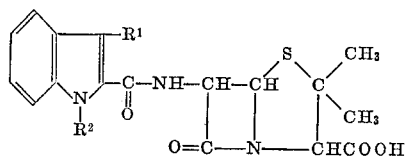

wherein $R^1$ and $R^2$ are each (lower)alkyl; and non-toxic, pharmaceutically acceptable salts thereof.

4. An acid of claim 1 having the formula:

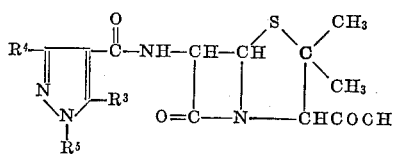

wherein $R^3$ and $R^4$ are each (lower)alkyl, phenyl, chlorophenyl or dichlorophenyl and $R^5$ is hydrogen, (lower)alkyl, phenyl, chlorophenyl or dichlorophenyl but at least one of $R^3$, $R^4$ and $R^5$ is (lower)alkyl or hydrogen; and non-toxic, pharmaceutically acceptable salts thereof.

5. An acid of claim 1 having the formula:

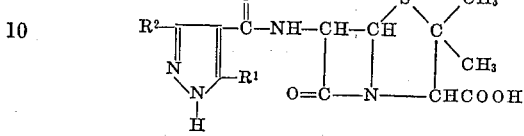

wherein $R^1$ and $R^2$ are each (lower)alkyl; and non-toxic, pharmaceutically acceptable salts thereof.

6. An acid of claim 1 having the formula:

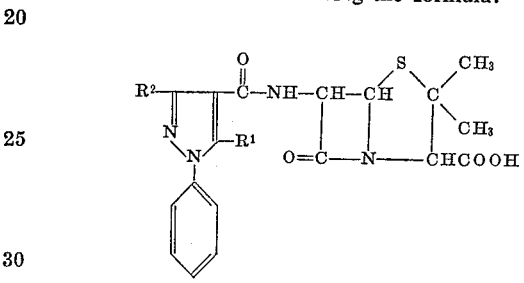

wherein $R^1$ and $R^2$ are each (lower)alkyl; and non-toxic, pharmaceutically acceptable salts thereof.

7. An acid of claim 1 having the formula:

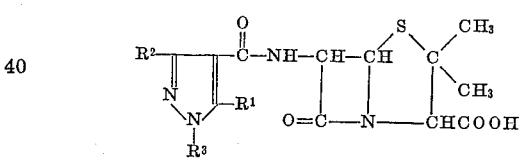

wherein $R^1$, $R^2$ and $R^3$ are each (lower)alkyl; and non-toxic pharmaceutically acceptable salts thereof.

8. An acid of claim 1 having the formula:

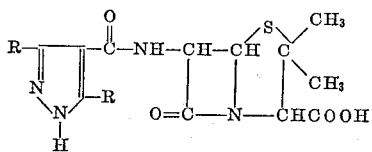

wherein one R group is (lower)alkyl and the other R group is phenyl, chlorophenyl or dichlorophenyl; and non-toxic, pharmaceutically acceptable salts thereof.

9. An acid of claim 1 having the formula:

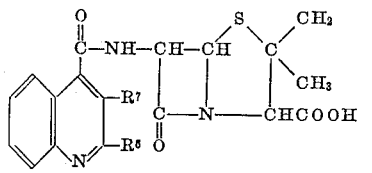

wherein $R^7$ is (lower)alkyl, (lower)alkoxy, chloro, bromo, phenyl or carbalkoxy and $R^6$ is hydrogen, (lower)

alkyl or phenyl and no more than one of $R^6$ and $R^7$ is phenyl, or $R^6$ and $R^7$ taken together form benz or trimethylene; and non-toxic, pharmaceutically acceptable salts thereof.

10. An acid of claim 1 having the formula:

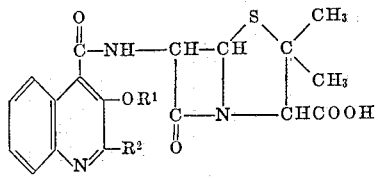

wherein $R^1$ and $R^2$ are each (lower)alkyl; and non-toxic, pharmaceutically acceptable salts thereof.

11. The compound of claim 1 which is 1-methyl-3-phenyl-2-indolylpenicillin.

12. The compound of claim 1 which is, 1,3-dimethyl-2-indolylpenicillin.

13. The compound of claim 1 which is 9-acridylpenicillin.

References Cited

UNITED STATES PATENTS

| 3,092,620 | 6/1963 | Seto | 260—239.1 |
| 3,169,127 | 2/1965 | Seto | 260—239.1 |
| 3,174,964 | 3/1965 | Hobbs et al. | 260—239.1 |
| 3,198,787 | 8/1965 | Hagemann et al. | 260—239.1 |
| 3,213,102 | 10/1965 | Tosoni et al. | 260—239.1 |

NICHOLAS S. RIZZO, *Primary Examiner.*

ALEX MAZEL, WALTER A. MODANCE,
*Examiners.*

J. W. ADAMS, *Assistant Examiner.*